(12) United States Patent
Hatta et al.

(10) Patent No.: US 11,965,323 B2
(45) Date of Patent: Apr. 23, 2024

(54) TOILET DEVICE

(71) Applicant: TOTO LTD., Kitakyushu (JP)

(72) Inventors: Ikko Hatta, Kitakyushu (JP);
Shonosuke Sawa, Kitakyushu (JP);
Mizuki Ide, Kitakyushu (JP); Yoshihiro Koto, Kitakyushu (JP)

(73) Assignee: TOTO LTD., Kitakyushu (JP)

( * ) Notice: Subject to any disclaimer, the term of this patent is extended or adjusted under 35 U.S.C. 154(b) by 93 days.

(21) Appl. No.: 17/817,124

(22) Filed: Aug. 3, 2022

(65) Prior Publication Data
US 2023/0068488 A1    Mar. 2, 2023

(30) Foreign Application Priority Data

Aug. 25, 2021 (JP) ................. 2021-137100

(51) Int. Cl.
| | |
|---|---|
| *E03D 9/08* | (2006.01) |
| *G01F 1/06* | (2006.01) |
| *G01F 15/00* | (2006.01) |
| *G01F 15/14* | (2006.01) |
| *G01K 1/14* | (2021.01) |

(52) U.S. Cl.
CPC ............. *E03D 9/08* (2013.01); *G01F 1/06* (2013.01); *G01F 15/005* (2013.01); *G01F 15/14* (2013.01); *G01K 1/14* (2013.01)

(58) Field of Classification Search
CPC . E03D 9/08; G01F 1/06; G01F 15/005; G01F 15/14; G01K 1/14
USPC ........................................... 4/420.2
See application file for complete search history.

(56) References Cited

U.S. PATENT DOCUMENTS

| | | | |
|---|---|---|---|
| 2019/0093329 A1* | 3/2019 | Ogawa | F24H 1/102 |
| 2019/0093330 A1* | 3/2019 | Matsuda | E03D 9/002 |
| 2021/0002884 A1* | 1/2021 | Yamamura | B01D 35/02 |
| 2021/0164211 A1* | 6/2021 | Yaoka | A61L 2/084 |
| 2021/0164212 A1* | 6/2021 | Baba | A61L 2/084 |

FOREIGN PATENT DOCUMENTS

JP   2018-009301 A   1/2018

* cited by examiner

*Primary Examiner* — Huyen D Le
(74) *Attorney, Agent, or Firm* — PEARNE & GORDON LLP

(57) ABSTRACT

According to the embodiment, a toilet device includes a nozzle, a flow channel, a heat exchanger, and a flow channel unit. The flow channel unit is located upstream or downstream of the heat exchanger in the flow channel. The flow channel unit includes a flow rate sensor and a vacuum breaker. The flow rate sensor detects a flow rate of water. The vacuum breaker suppresses a backflow of water. The flow rate sensor includes a first case part and a sensor part. The sensor part is housed inside the first case part. The vacuum breaker includes a second case part and a valve part. The valve part is housed inside the second case part. At least a part of the first case part and at least a part of the second case part is formed of a continuous member.

7 Claims, 9 Drawing Sheets

TOILET DEVICE

CROSS-REFERENCE TO RELATED APPLICATIONS

This application is based upon and claims the benefit of priority from Japanese Patent Application No. 2021-137100, filed on Aug. 25, 2021; the entire contents of which are incorporated herein by reference.

FIELD

Embodiments described herein relate generally to a toilet device.

BACKGROUND

In a sanitary washing device that includes a nozzle discharging water toward a human body private part, it is known to provide units such as a flow rate sensor detecting the flow rate of water, a vacuum breaker suppressing the backflow of water, and the like in a flow channel connecting a water supply source and the nozzle (e.g., JP-A 2018-009301). It is desirable to downsize the units located in the flow channel of such a sanitary washing device to downsize the entire device.

SUMMARY

According to the embodiment, a toilet device includes a nozzle, a flow channel, a heat exchanger, and a flow channel unit. The nozzle discharges water toward a human body private part. The flow channel connects a water supply source and the nozzle. The heat exchanger is located in the flow channel. The heat exchanger warms water supplied from the water supply source. The flow channel unit is located upstream or downstream of the heat exchanger in the flow channel. The flow channel unit includes a flow rate sensor and a vacuum breaker. The flow rate sensor detects a flow rate of water. The vacuum breaker suppresses a backflow of water. The flow rate sensor includes a first case part and a sensor part. The sensor part is housed inside the first case part. The vacuum breaker includes a second case part and a valve part. The valve part is housed inside the second case part. At least a part of the first case part and at least a part of the second case part is formed of a continuous member.

DETAILED DESCRIPTION

Figure 1:
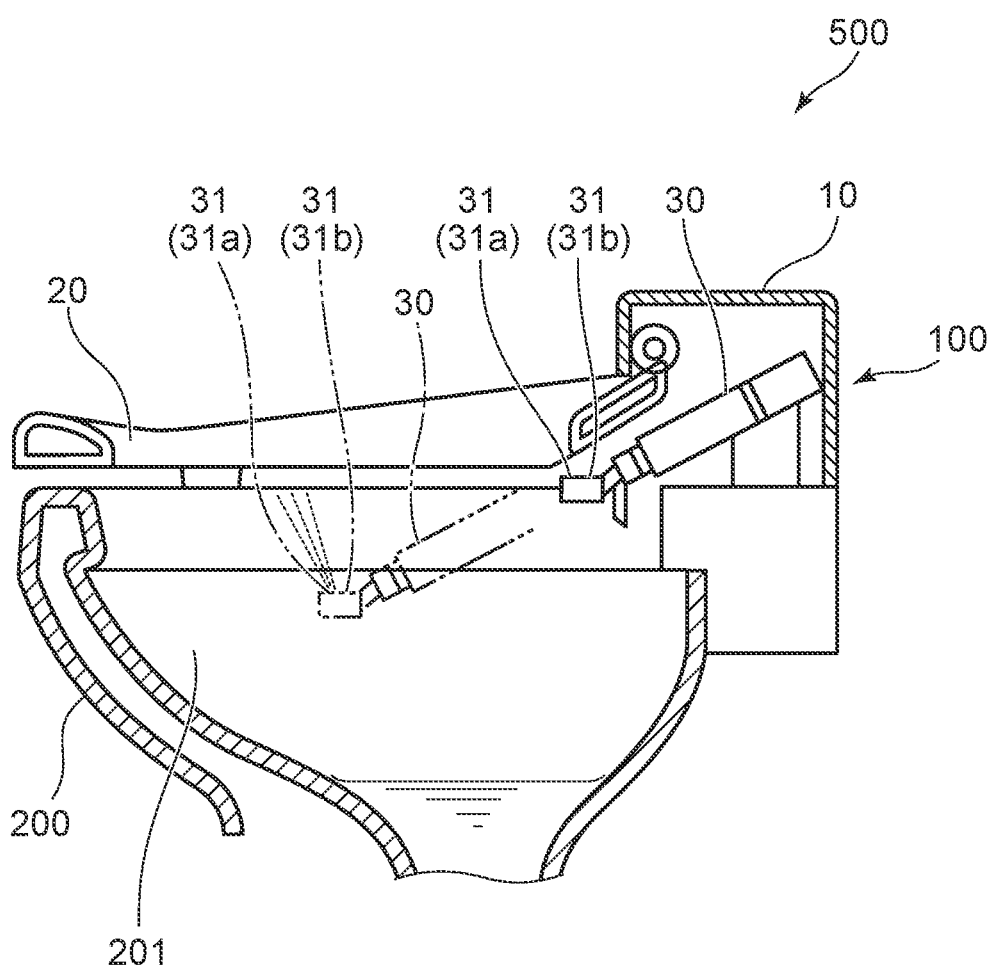
FIG. 1 is a cross-sectional view illustrating a toilet device according to an embodiment.

A first invention is a toilet device including a nozzle discharging water toward a human body private part, a flow channel connecting a water supply source and the nozzle, a heat exchanger located in the flow channel, and a flow channel unit located upstream or downstream of the heat exchanger in the flow channel, wherein the heat exchanger warms water supplied from the water supply source, the flow channel unit includes a flow rate sensor and a vacuum breaker, the flow rate sensor detects a flow rate of water, the vacuum breaker suppresses a backflow of water, the flow rate sensor includes a first case part and a sensor part, the sensor part is housed inside the first case part, the vacuum breaker includes a second case part and a valve part, the valve part is housed inside the second case part, and at least a part of the first case part and at least a part of the second case part are formed of a continuous member.

According to the toilet device, the path in which the water flows in the flow rate sensor and the path in which the water flows in the vacuum breaker can be shared by forming at least a part of the first case part of the flow rate sensor and at least a part of the second case part of the vacuum breaker from a continuous member; and the flow channel unit can be downsized. The toilet device can be downsized thereby.

A second invention is the toilet device of the first invention, wherein the sensor part includes an impeller rotated by a flow of water, the valve part includes a float switching between an outflow of water and an inflow of air, the first case part includes a first lower case part and a first upper case part, the first upper case part is fixed by fusing to the first lower case part, the second case part includes a second lower case part and a second upper case part, the second upper case part is fixed by fusing to the second lower case part, the first lower case part and the second lower case part are formed of a continuous member, and the first upper case part and the second upper case part are formed of a continuous member.

According to the toilet device, the fusing spots can be reduced by forming the first lower case part of the flow rate sensor and the second lower case part of the vacuum breaker from a continuous member and by forming the first upper case part of the flow rate sensor and the second upper case part of the vacuum breaker from a continuous member; and the water leakage reliability can be improved.

A third invention is the toilet device of the first or second invention, wherein the flow channel unit is located downstream of the heat exchanger, and the vacuum breaker is located downstream of the flow rate sensor.

According to the toilet device, the flow rate sensor can detect the absence of water flowing in the heat exchanger by providing the flow channel unit downstream of the heat exchanger. Empty-heating of the heat exchanger can be suppressed thereby. Also, by providing the vacuum breaker downstream of the flow rate sensor (i.e., by providing the flow rate sensor upstream of the vacuum breaker), absence of water flowing in the heat exchanger can be detected more quickly. The empty-heating of the heat exchanger can be more reliably suppressed thereby.

A fourth invention is the toilet device of the third invention, wherein the flow channel unit is connected to a downstream end of the heat exchanger.

According to the toilet device, the absence of water flowing in the heat exchanger can be detected more quickly by connecting the flow channel unit to the downstream end of the heat exchanger. The empty-heating of the heat exchanger can be more reliably suppressed thereby.

A fifth invention is the toilet device of any one of the first to fourth inventions, wherein the flow channel unit further includes a first temperature sensor and a second temperature sensor detecting a temperature of water, the first temperature sensor is located upstream of the flow rate sensor, and the second temperature sensor is located downstream of the flow rate sensor.

According to the toilet device, by providing the first temperature sensor upstream of the flow rate sensor, the first temperature sensor can detect the temperature of water flowing from the heat exchanger toward the flow rate sensor and can detect whether or not the water is warmed to or above the set temperature. By providing the second temperature sensor downstream of the flow rate sensor, the second temperature sensor can detect whether or not the warm water flowing on the side more proximate to the nozzle has been abnormally heated to a temperature greater than the set temperature. Also, the toilet device can be downsized by providing the first temperature sensor and the second temperature sensor in the flow channel unit.

A sixth invention is the toilet device of the second invention, wherein the flow channel unit includes a water inlet positioned at an upstream end of the flow channel unit, the flow channel unit includes a water outlet positioned at a downstream end of the flow channel unit, the second upper case part includes an intake port positioned above the float, and the intake port is located at a higher position than the water outlet.

According to the toilet device, by providing the intake port at a higher position than the water outlet, the backflow of water can be reliably suppressed by the air pulled through the intake port when negative pressure is generated.

A seventh invention is the toilet device of the sixth invention, wherein the flow channel unit includes a first flow channel extending upward from the water inlet, a second flow channel extending in a horizontal direction from the first flow channel via the impeller to a position below the float, a third flow channel extending upward from the second flow channel and passing through the vacuum breaker, and a fourth flow channel extending downward from the third flow channel, wherein the fourth flow channel is connected to the water outlet.

According to the toilet device, because the flow channel unit includes the first flow channel, the third flow channel, and the fourth flow channel that extend in the vertical direction, the space can be used more effectively than when all flow channels extend in the horizontal direction; and the flow channel unit can be further downsized.

Embodiments of the invention will now be described with reference to the drawings. Similar components in the drawings are marked with the same reference numerals, and a detailed description is omitted as appropriate.

FIG. 1 is a cross-sectional view illustrating a toilet device according to an embodiment.

As illustrated in FIG. 1, the toilet device 500 includes a western-style sit-down toilet (for convenience of description hereinbelow, called simply the "toilet") 200, and a sanitary washing device 100 located on the toilet 200. The toilet 200 may be a "floor-mounted" type mounted on the floor surface of a toilet room or may be a "wall-hung" type mounted on a wall surface or lining of the toilet room. The sanitary washing device 100 includes a casing 10, a toilet seat 20, and a toilet lid (not illustrated). The toilet seat 20 and the toilet lid each are pivotally supported to be openable and closable with respect to the casing 10.

A body wash functional unit that realizes the washing of a human body private part such as a "bottom" or the like of a user sitting on the toilet seat 20, etc., are included inside the casing 10. For example, the user can operate an operation part 300 such as a remote control or the like (see FIG. 2) to advance a nozzle 30 into a bowl 201 of the toilet 200 and discharge water. In FIG. 1, a state in which the nozzle 30 is advanced from the casing 10 into the bowl 201 is illustrated by a double dot-dash line, and a state in which the nozzle 30 is retracted from the interior of the bowl 201 and stored inside the casing 10 is illustrated by a solid line.

A water discharge port 31 is provided in the tip portion of the nozzle 30. The nozzle 30 washes the human body private part by discharging water from the water discharge port 31 toward the human body private part. Multiple water discharge ports 31 may be provided. For example, a bidet wash water discharge port 31a, a bottom wash water discharge port 31b, etc., are provided as the water discharge ports 31. The nozzle 30 can wash a female private part of a female sitting on the toilet seat 20 by squirting water from the bidet wash water discharge port 31a provided in the tip of the nozzle 30. The nozzle 30 can wash the "bottom" of the user sitting on the toilet seat 20 by squirting water from the bottom wash water discharge port 31b provided in the tip of the nozzle 30.

In this specification, "water" includes not only cold water but also warm water that is heated.

In the toilet device 500, a seat-type sanitary washing device 100 may be mounted on the toilet 200, or the functional units of the sanitary washing device 100 may be mounted inside the toilet 200. Hereinbelow, an example is described in which a seat-type sanitary washing device 100 is mounted on the toilet 200.

Figure 2:
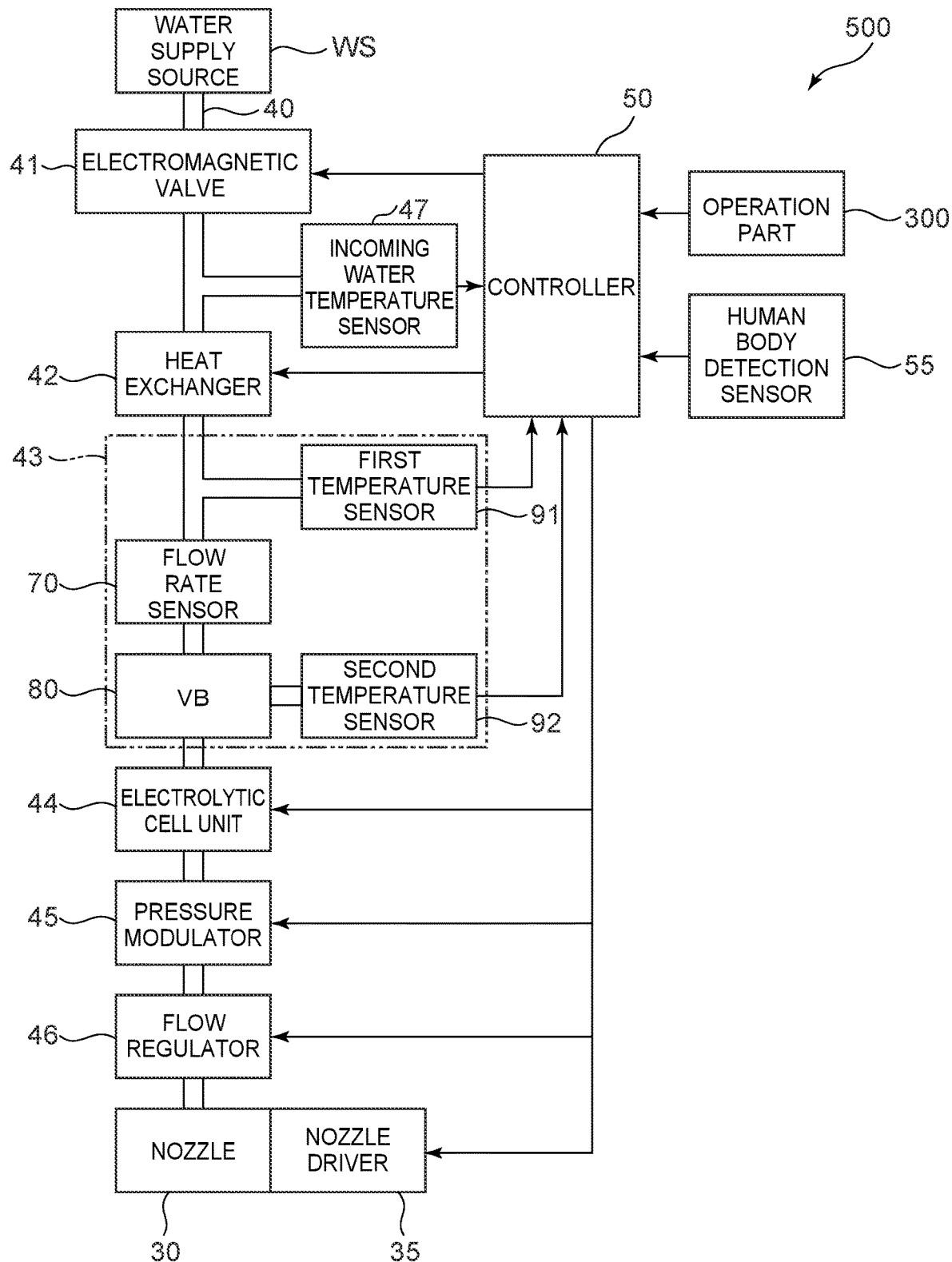
FIG. 2 is a block diagram illustrating the configuration of the toilet device according to the embodiment.

FIG. 2 is a block diagram illustrating the configuration of the toilet device according to the embodiment.

The configurations of the water channel system and the electrical system are illustrated together in FIG. 2.

As illustrated in FIG. 2, the toilet device 500 (the sanitary washing device 100) includes a flow channel 40. The flow channel 40 is located inside the casing 10 and connects the nozzle 30 and a water supply source WS such as a service water line, a water storage tank, etc. The flow channel 40 supplies the water supplied from the water supply source WS to the nozzle 30.

The flow channel 40 includes an electromagnetic valve 41, a heat exchanger 42, a flow channel unit 43, an electrolytic cell unit 44, a pressure modulator 45, and a flow regulator 46. A pressure regulator valve, a check valve, a flow path switcher, etc., may be included in the flow channel 40 as necessary. For example, the pressure regulator valve and the check valve are located between the electromagnetic valve 41 and the heat exchanger 42. For example, the flow path switcher is located between the flow regulator 46 and the nozzle 30.

The electromagnetic valve 41 is located at the upstream side of the flow channel 40. The electromagnetic valve 41 controls the supply of the water downstream from the water supply source WS, i.e., the supply of the water from the water supply source WS toward the nozzle 30. The electromagnetic valve 41 is, for example, an openable and closable solenoid valve. The electromagnetic valve 41 is electrically connected with a controller 50 located inside the casing 10. The electromagnetic valve 41 opens and closes the flow channel 40 based on a command from the controller 50. The water that is supplied from the water supply source WS is caused to flow toward the downstream side by setting the electromagnetic valve 41 to the open state. The water supply toward the downstream side is stopped by setting the electromagnetic valve 41 to the closed state.

The heat exchanger 42 is located downstream of the electromagnetic valve 41. The heat exchanger 42 includes a heater and heats the water supplied via the electromagnetic valve 41 to a specified temperature. In other words, the heat exchanger 42 produces warm water. The heat exchanger 42 is, for example, an instantaneous heat exchanger that does not include a warm water storage tank storing warm water. The instantaneous heat exchanger includes, for example, a ceramic heater, etc. Compared to a hot water storage-type heat exchanger that uses a warm water storage tank, the instantaneous heat exchanger can heat water to a specified temperature in a short period of time. The heat exchanger 42 may be a hot water storage-type heat exchanger.

The heat exchanger 42 is electrically connected with the controller 50. For example, the controller 50 heats the water to the temperature set by the operation part 300 by operating the heat exchanger 42 (i.e., switching the heater on) according to an operation of the operation part 300 by the user.

The flow channel unit 43 is located downstream of the heat exchanger 42. For example, the flow channel unit 43 is connected to the downstream end of the heat exchanger 42. That is, for example, the flow channel unit 43 is located at a position next to the heat exchanger 42. In other words, for example, other components (units) are not located between the heat exchanger 42 and the flow channel unit 43. The flow channel unit 43 may be located upstream of the heat exchanger 42.

The flow channel unit 43 includes a flow rate sensor 70, a vacuum breaker (VB) 80, a first temperature sensor 91, and a second temperature sensor 92. The structure of the flow channel unit 43 is described below.

The flow rate sensor 70 detects the flow rate of water flowing through the flow channel 40. For example, the flow rate sensor 70 detects whether or not water is flowing in the heat exchanger 42. The flow rate sensor 70 is electrically connected with the controller 50. The flow rate sensor 70 outputs the detection result (information related to the flow rate) to the controller 50.

The vacuum breaker 80 suppresses the backflow of water. The vacuum breaker 80 includes an intake port (an intake port 81c described below) for allowing air into the flow channel, and a valve mechanism (a valve part 82 described below) that opens and closes the intake port. The valve mechanism blocks the intake port when water is flowing in the flow channel 40, and allows air into the flow channel 40 by opening the intake port when the flow of the water is stopped. In other words, the vacuum breaker 80 allows air into the flow channel 40 when water does not flow in the flow channel 40. The valve mechanism includes, for example, a float valve (a float 82a described below). For example, the vacuum breaker 80 is located downstream of the flow rate sensor 70. The vacuum breaker 80 may be located upstream of the flow rate sensor 70.

For example, by allowing air into the flow channel 40 as described above, the vacuum breaker 80 promotes the water drainage of the part of the flow channel 40 downstream of the vacuum breaker 80. For example, the vacuum breaker 80 promotes the water drainage of the nozzle 30. Thus, by draining the water inside the nozzle 30 and allowing air into the nozzle 30, for example, the vacuum breaker 80 prevents the wash water inside the nozzle 30, the liquid waste collected inside the bowl 201, etc., from undesirably backflowing toward the water supply source WS (the fresh water) side.

The first temperature sensor 91 detects the temperature of the water flowing downstream of the heat exchanger 42. For example, the first temperature sensor 91 is located upstream of the flow rate sensor 70. The first temperature sensor 91 is, for example, a thermistor. The first temperature sensor 91 is electrically connected with the controller 50. The first temperature sensor 91 outputs the detection result (information related to the temperature) to the controller 50.

The second temperature sensor 92 is located downstream of the first temperature sensor 91. The second temperature sensor 92 detects the temperature of the water flowing downstream of the first temperature sensor 91. For example, the second temperature sensor 92 is located downstream of the flow rate sensor 70. The second temperature sensor 92 is, for example, a thermistor. The second temperature sensor 92 is electrically connected with the controller 50. The second temperature sensor 92 outputs the detection result (information related to the temperature) to the controller 50.

The electrolytic cell unit 44 is located downstream of the flow channel unit 43. The electrolytic cell unit 44 produces a liquid (functional water) including hypochlorous acid from tap water by electrolyzing the tap water flowing through the interior of the electrolytic cell unit 44. The electrolytic cell unit 44 is electrically connected with the controller 50. The electrolytic cell unit 44 produces the functional water based on a control by the controller 50.

The functional water that is produced by the electrolytic cell unit 44 may be, for example, a solution including metal ions such as silver ions, copper ions, etc. Or, the functional water that is produced by the electrolytic cell unit 44 may be a solution including electrolytic chlorine, ozone, etc. Or, the functional water that is produced by the electrolytic cell unit 44 may be acidic water or alkaline water.

The pressure modulator 45 is located downstream of the electrolytic cell unit 44. The pressure modulator 45 applies a pulsatory motion or an acceleration to the flow of the water inside the flow channel 40, and applies a pulsatory motion to the water discharged from the water discharge port 31 of the nozzle 30. In other words, the pressure modulator 45 causes the fluidic state of the water flowing through the flow channel 40 to fluctuate. The pressure modulator 45 is, for example, an electromagnetic pump. The pressure modulator 45 is electrically connected with the controller 50. The pressure modulator 45 causes the fluidic state of the water to fluctuate based on a control by the controller 50.

The flow regulator 46 is located downstream of the pressure modulator 45. The flow regulator 46 regulates the water force (the flow rate). The flow regulator 46 is electrically connected with the controller 50. The operation of the flow regulator 46 is controlled by the controller 50.

The nozzle 30 is located downstream of the flow regulator 46. The nozzle 30 discharges the water heated by the heat exchanger 42 toward the human body private part in a state of the nozzle 30 being advanced frontward from the casing 10.

In the example, an incoming water temperature sensor 47 is located upstream of the heat exchanger 42. The incoming water temperature sensor 47 detects the temperature of the water flowing upstream of the heat exchanger 42. The incoming water temperature sensor 47 is, for example, a thermistor. The incoming water temperature sensor 47 is electrically connected with the controller 50. The incoming water temperature sensor 47 outputs the detection result (information related to the temperature) to the controller 50.

The toilet device 500 (the sanitary washing device 100) includes a nozzle driver 35 for advancing and retracting the nozzle 30. The nozzle driver 35 is electrically connected with the controller 50. The nozzle driver 35 advances and retracts the nozzle 30 based on a command from the controller 50.

The toilet device 500 (the sanitary washing device 100) includes, for example, a human body detection sensor 55 detecting a human body. The human body detection sensor 55 is, for example, at least one of a seating detection sensor that detects the seating of the user on the toilet seat 20, a room entrance detection sensor that detects the entrance of the user into the toilet room, or a proximity detection sensor detecting the approach of the user toward the toilet device 500. The human body detection sensor 55 is electrically connected with the controller 50. The human body detection sensor 55 outputs the detection result (information related to the human body detection) to the controller 50.

The controller 50 includes a control circuit such as a microcomputer, etc. The controller 50 includes, for example, a CPU (Central Processing Unit). The controller 50 may include, for example, a comparator. The controller 50 controls the operations of the electromagnetic valve 41, the heat exchanger 42, the electrolytic cell unit 44, the pressure modulator 45, the flow regulator 46, the nozzle driver 35, etc., based on the signals from the operation part 300 and/or the detection result from the human body detection sensor 55.

The controller 50 controls the operation of the heat exchanger 42 based on the detection result (a first temperature T1) of the first temperature sensor 91. For example, the controller 50 switches the heater of the heat exchanger 42 on when the first temperature T1 is less than the setting value set by the operation part 300, etc., and switches the heater of the heat exchanger 42 off when the first temperature T1 is greater than the setting value. For example, the controller 50 may reduce the output of the heater of the heat exchanger 42 when the first temperature T1 is greater than the setting value, and may increase the output of the heater of the heat exchanger 42 when the first temperature T1 is less than the setting value. Thereby, water that is heated to a temperature close to the setting value set by the operation part 300 or the like can be discharged from the nozzle 30.

The controller 50 controls the operation of the electromagnetic valve 41 based on the detection result (a second temperature T2) of the second temperature sensor 92. For example, the controller 50 closes the electromagnetic valve 41 when the second temperature T2 is greater than a predetermined specified value. The controller 50 may control the operation of the heat exchanger 42 based on the detection result (the second temperature T2) of the second temperature sensor 92. For example, the controller 50 may switch the heater of the heat exchanger 42 off when the second temperature T2 is greater than a predetermined specified value. The specified value is set to be not more than 65° C. (e.g., 53° C.). Thereby, the discharge of hot water from the nozzle 30 can be suppressed even when the water is heated to an excessively high temperature due to a malfunction of the heat exchanger 42, etc.

The flow channel unit 43 will now be described in more detail.

Figure 3:
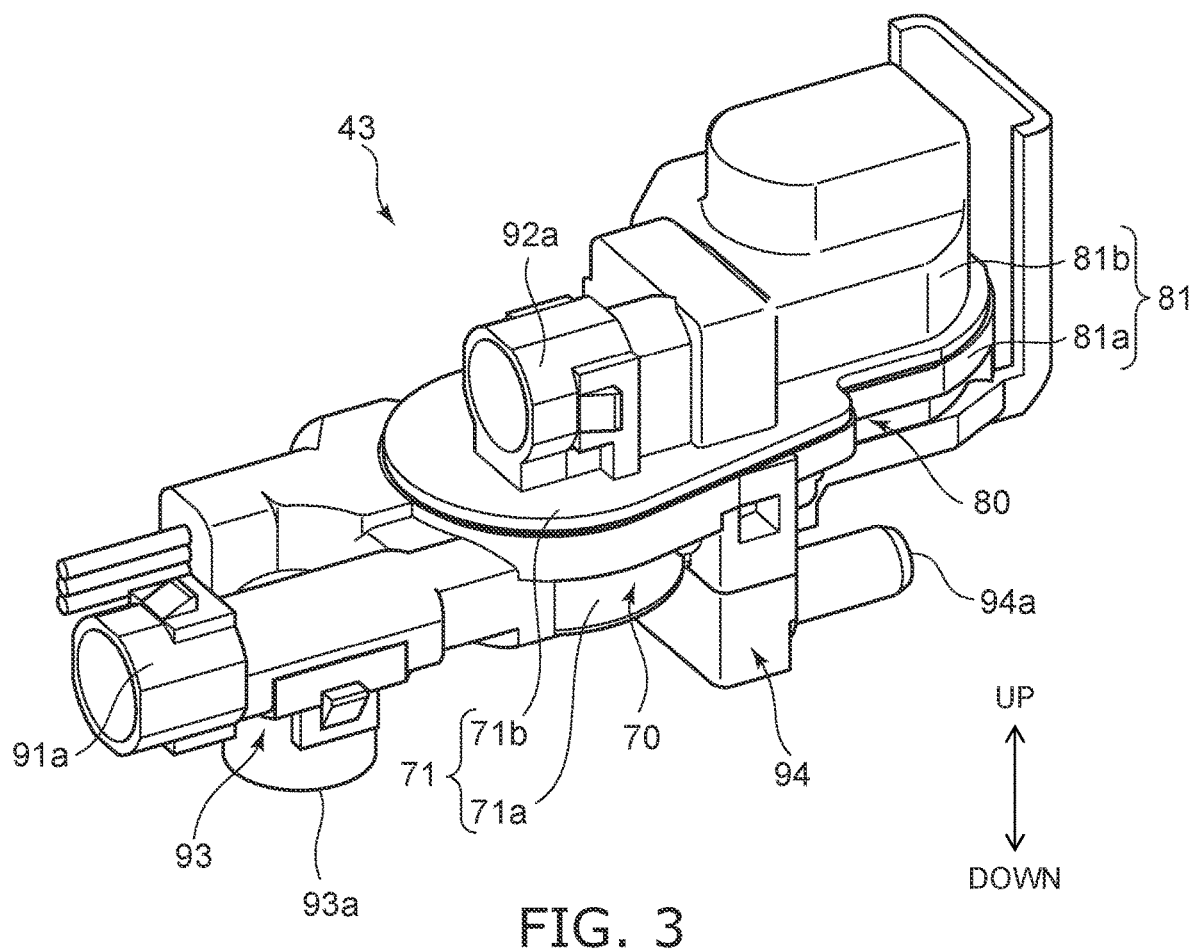
FIG. 3 is a perspective view illustrating the flow channel unit according to the embodiment.

FIG. 3 is a perspective view illustrating the flow channel unit according to the embodiment.

Figure 4:
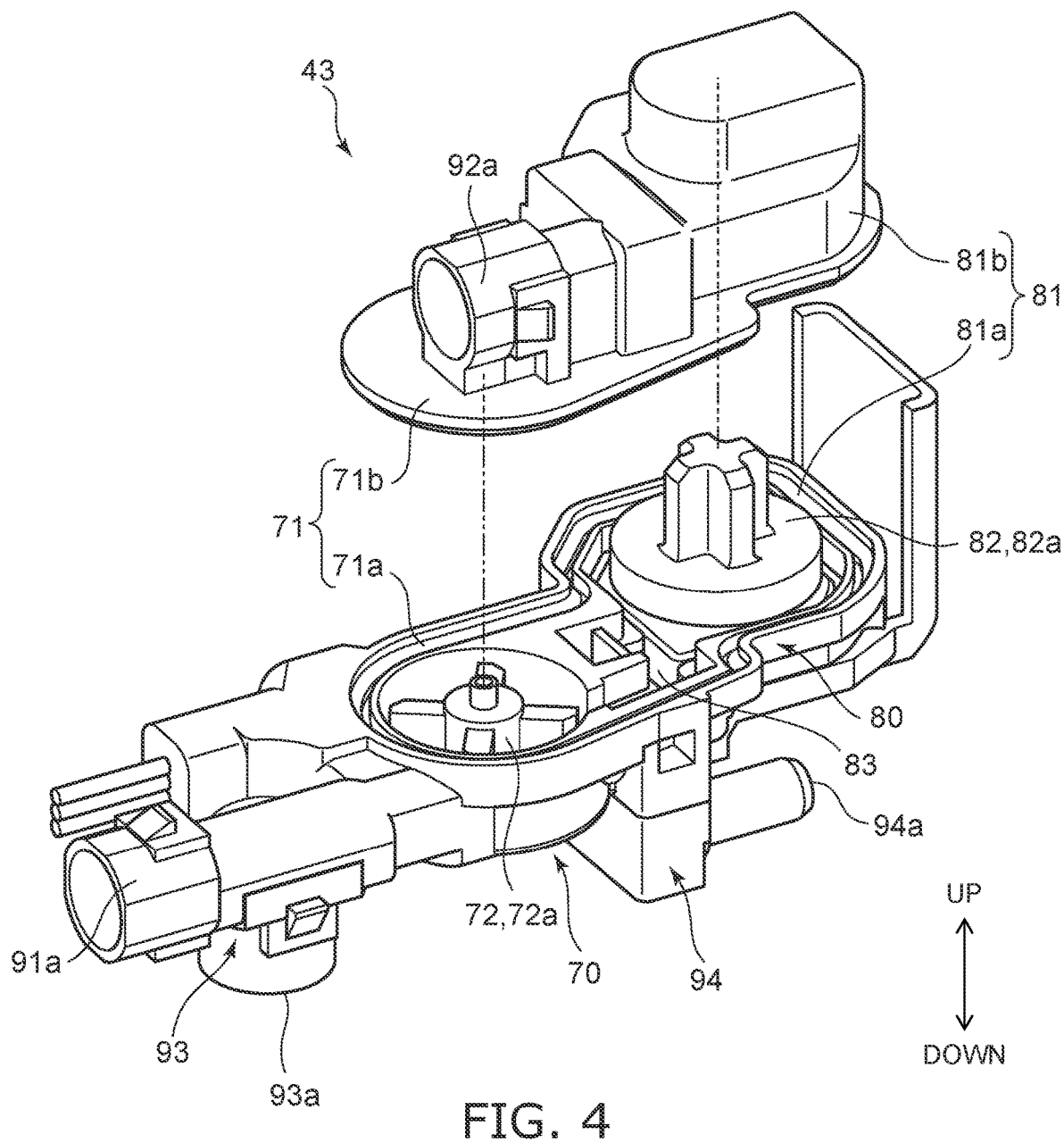
FIG. 4 is an exploded perspective view illustrating the flow channel unit according to the embodiment.
Figure 5:
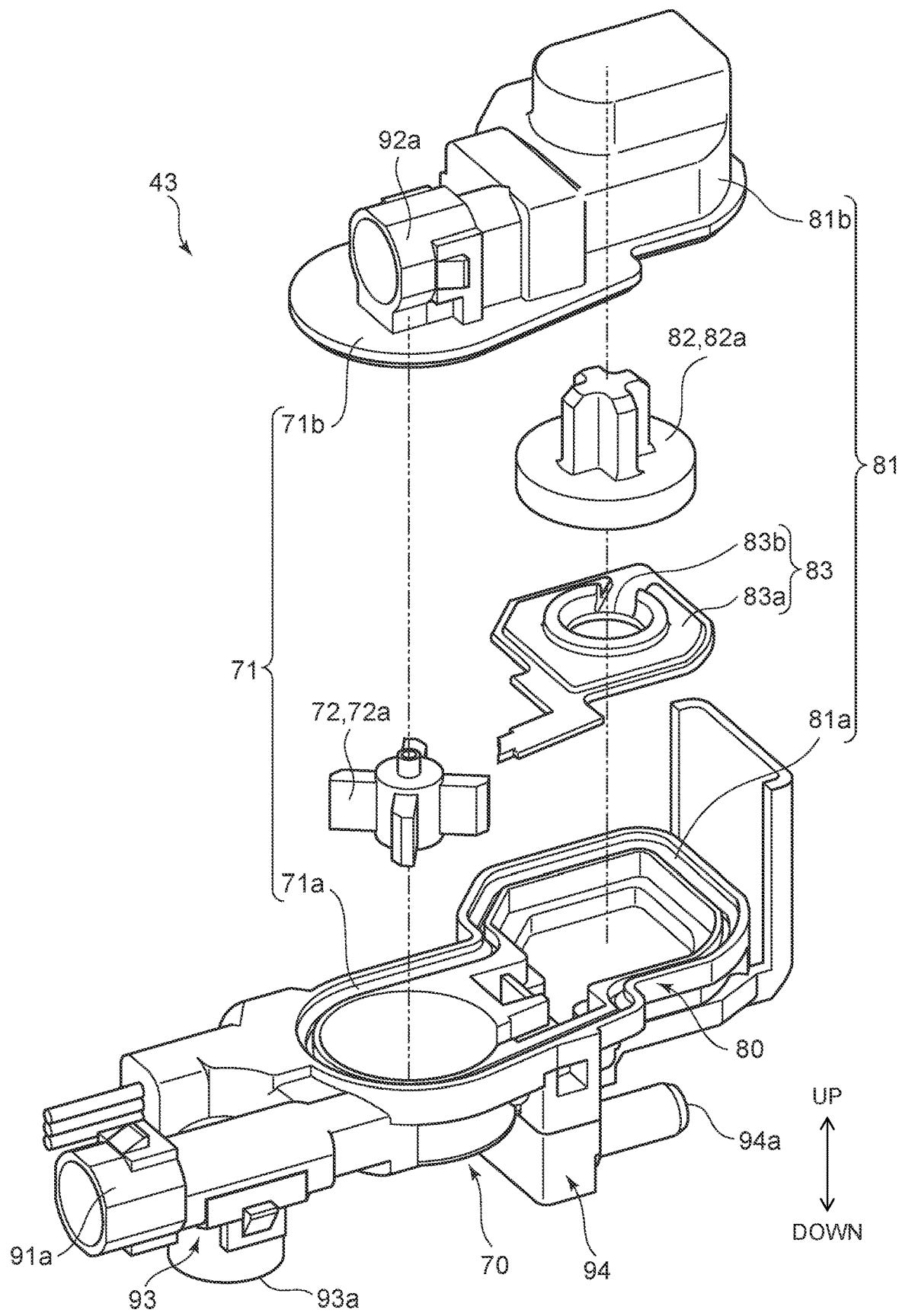
FIG. 5 is an exploded perspective view illustrating the flow channel unit according to the embodiment.

FIGS. 4 and 5 are exploded perspective views illustrating the flow channel unit according to the embodiment.

As illustrated in FIGS. 3 to 5, the flow channel unit 43 includes the flow rate sensor 70 and the vacuum breaker 80.

The flow rate sensor 70 includes a first case part 71 and a sensor part 72. The sensor part 72 is housed inside the first case part 71. The sensor part 72 includes, for example, an impeller 72a rotated by the flow of water. For example, the flow rate sensor 70 detects the flow rate according to the rotation of the impeller 72a.

The first case part 71 includes a first lower case part 71a and a first upper case part 71b. The first upper case part 71b is fixed by fusing to the first lower case part 71a. The sensor part 72 (the impeller 72a) is located inside a space formed by the first lower case part 71a and the first upper case part 71b. For example, the sensor part 72 (the impeller 72a) is placed on the first lower case part 71a. In the example, the first lower case part 71a includes a recess that is recessed downward; and the sensor part 72 (the impeller 72a) is housed inside the recess. The first upper case part 71b covers the sensor part 72 (the impeller 72a) from above.

The vacuum breaker 80 includes a second case part 81, the valve part 82, and a pedestal part 83. The valve part 82 and the pedestal part 83 are housed inside the second case part 81. The valve part 82 includes, for example, a float 82a that switches between the outflow of water and the inflow of air. The valve part 82 is located on the pedestal part 83. The pedestal part 83 includes a main part 83a, and a hole part 83b extending through the main part 83a in the vertical direction.

The second case part 81 includes a second lower case part 81a and a second upper case part 81b. The second upper case part 81b is fixed by fusing to the second lower case part 81a. The valve part 82 (the float 82a) and the pedestal part 83 are located inside the space formed by the second lower case part 81a and the second upper case part 81b. For example, the pedestal part 83 is placed on the second lower case part 81a. For example, the valve part 82 (the float 82a) is placed on the pedestal part 83. In the example, the second lower case part 81a includes a recess that is recessed downward; the pedestal part 83 is housed inside the recess; and the valve part 82 (the float 82a) is located on the pedestal part 83. The second upper case part 81b covers the valve part 82 (the float 82a) and the pedestal part 83 from above.

In the example, the valve part 82 (the float 82a) protrudes higher than the second lower case part 81a. The second upper case part 81b is recessed upward; and the upper part of the valve part 82 (the float 82a) is positioned inside the space formed by the recess. The intake port 81c that is described below also is located in the recess.

According to the embodiment, at least a part of the first case part 71 and at least a part of the second case part 81 are formed of a continuous member. In the example, the first lower case part 71a and the second lower case part 81a are formed of a continuous member. In the example, the first upper case part 71b and the second upper case part 81b are formed of a continuous member.

In this specification, "continuous member" refers to a structure body that is formed by, for example, one-piece molding, etc., and is continuous without breaks. That is, a structure body in which multiple members are bonded by an adhesive, fusing, etc., or a structure body in which multiple members are fixed by engaging, screwing, etc., are not included in "continuous member".

The flow channel unit 43 also includes an incoming water case part 93. The incoming water case part 93 is located upstream of the first lower case part 71a and is connected with the first lower case part 71a. The incoming water case part 93 does not overlap the first upper case part 71b in the vertical direction. A water inlet 93a is provided in the incoming water case part 93. The water inlet 93a is positioned at the upstream end of the flow channel unit 43 and guides the water supplied from upstream of the flow channel unit 43 into the flow channel unit 43. For example, the water inlet 93*a* is connected to the downstream end of the heat exchanger 42. The water inlet 93*a* is provided in the lower part of the incoming water case part 93. In the example, the incoming water case part 93 and the first lower case part 71*a* are formed of a continuous member.

The incoming water case part 93 also includes a first sensor mounting part 91*a* for mounting the first temperature sensor 91. For example, the first temperature sensor 91 is mounted by being inserted through the first sensor mounting part 91*a* into the flow channel unit 43. Thereby, the first temperature sensor 91 can be located upstream of the flow rate sensor 70.

The flow channel unit 43 also includes an outgoing water case part 94. The outgoing water case part 94 is located below the second lower case part 81*a* and is connected with the second lower case part 81*a*. A water outlet 94*a* is provided in the outgoing water case part 94. The water outlet 94*a* is positioned at the downstream end of the flow channel unit 43 and guides the water passing through the interior of the flow channel unit 43 downstream of the flow channel unit 43. In the example, the outgoing water case part 94 and the second lower case part 81*a* are not formed of a continuous member. The outgoing water case part 94 and the second lower case part 81*a* may be formed of a continuous member.

In the example, a second sensor mounting part 92*a* for mounting the second temperature sensor 92 is located in the second upper case part 81*b*. The second sensor mounting part 92*a* is located above the first upper case part 71*b*. For example, the second temperature sensor 92 is mounted by being inserted through the second sensor mounting part 92*a* into the flow channel unit 43. Thereby, the second temperature sensor 92 can be located downstream of the flow rate sensor 70.

Thus, by forming at least a part of the first case part 71 of the flow rate sensor 70 and at least a part of the second case part 81 of the vacuum breaker 80 from a continuous member, the path in which the water flows in the flow rate sensor 70 and the path in which the water flows in the vacuum breaker 80 can be shared, and the flow channel unit 43 can be downsized. The toilet device 500 (the sanitary washing device 100) can be downsized thereby.

The fusing spots can be reduced by forming the first lower case part 71*a* of the flow rate sensor 70 and the second lower case part 81*a* of the vacuum breaker 80 from a continuous member and by forming the first upper case part 71*b* of the flow rate sensor 70 and the second upper case part 81*b* of the vacuum breaker 80 from a continuous member; and the water leakage reliability can be improved.

By providing the flow channel unit 43 downstream of the heat exchanger 42, the absence of water flowing in the heat exchanger 42 can be detected by the flow rate sensor 70. The empty-heating of the heat exchanger 42 can be suppressed thereby. By providing the vacuum breaker 80 downstream of the flow rate sensor 70 (i.e., by providing the flow rate sensor 70 upstream of the vacuum breaker 80), the absence of water flowing in the heat exchanger 42 can be detected more quickly. The empty-heating of the heat exchanger 42 can be more reliably suppressed thereby.

By connecting the flow channel unit 43 to the downstream end of the heat exchanger 42, the absence of water flowing in the heat exchanger 42 can be detected more quickly. The empty-heating of the heat exchanger 42 can be more reliably suppressed thereby.

By providing the first temperature sensor 91 upstream of the flow rate sensor 70, the first temperature sensor 91 can detect the temperature of the water flowing from the heat exchanger 42 toward the flow rate sensor 70 and can detect whether or not the water is warmed to or above the set temperature. By providing the second temperature sensor 92 downstream of the flow rate sensor 70, the second temperature sensor 92 can detect whether or not the warm water flowing on the side more proximate to the nozzle 30 has been abnormally heated to a temperature greater than the set temperature. By providing the first temperature sensor 91 and the second temperature sensor 92 in the flow channel unit 43, the toilet device 500 (the sanitary washing device 100) can be downsized.

Figure 6:
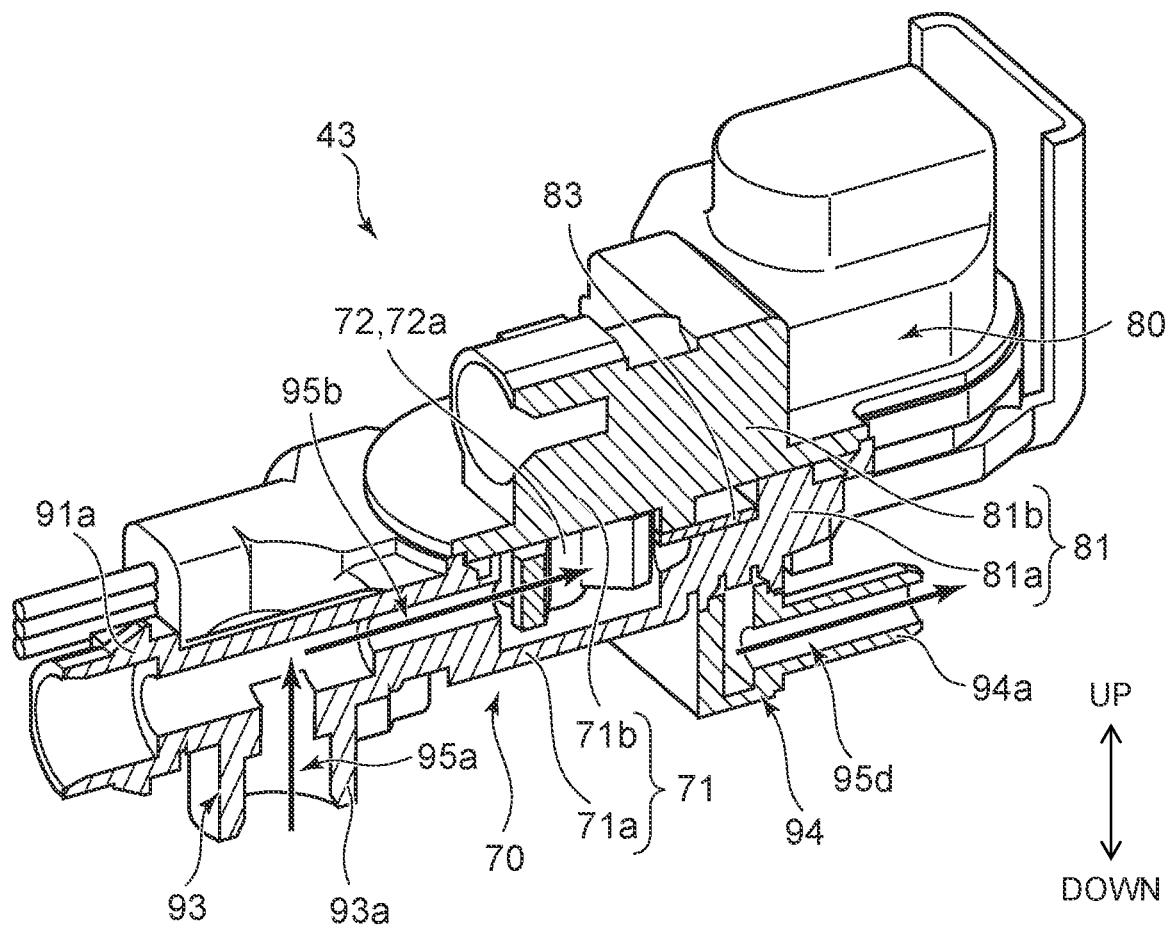
FIG. 6 is a perspective cross-sectional view illustrating the flow channel unit according to the embodiment.

FIG. 6 is a perspective cross-sectional view illustrating the flow channel unit according to the embodiment.

Figure 7:
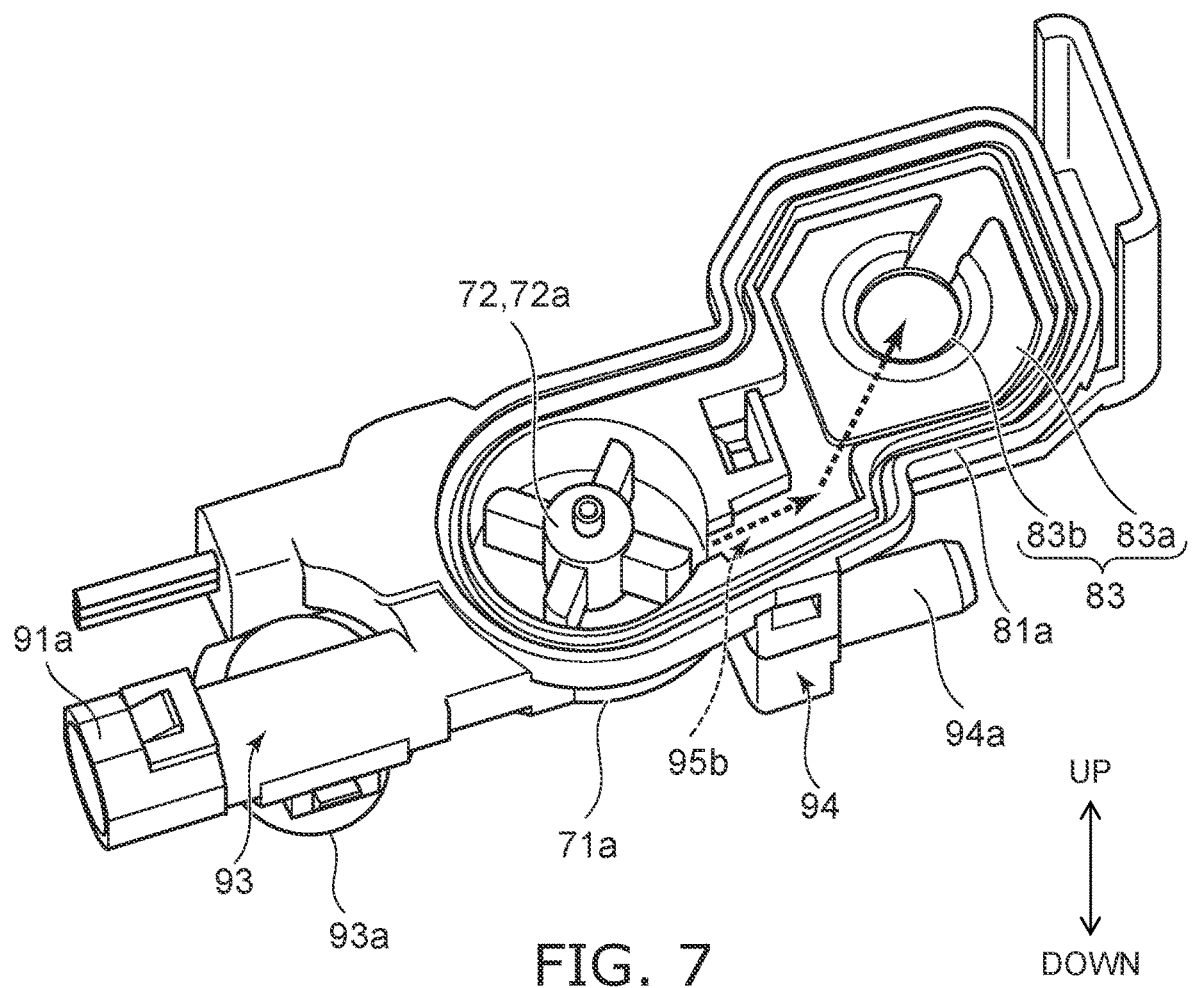
FIG. 7 is a perspective view illustrating a part of the flow channel unit according to the embodiment.

FIG. 7 is a perspective view illustrating a part of the flow channel unit according to the embodiment.

Figure 8:
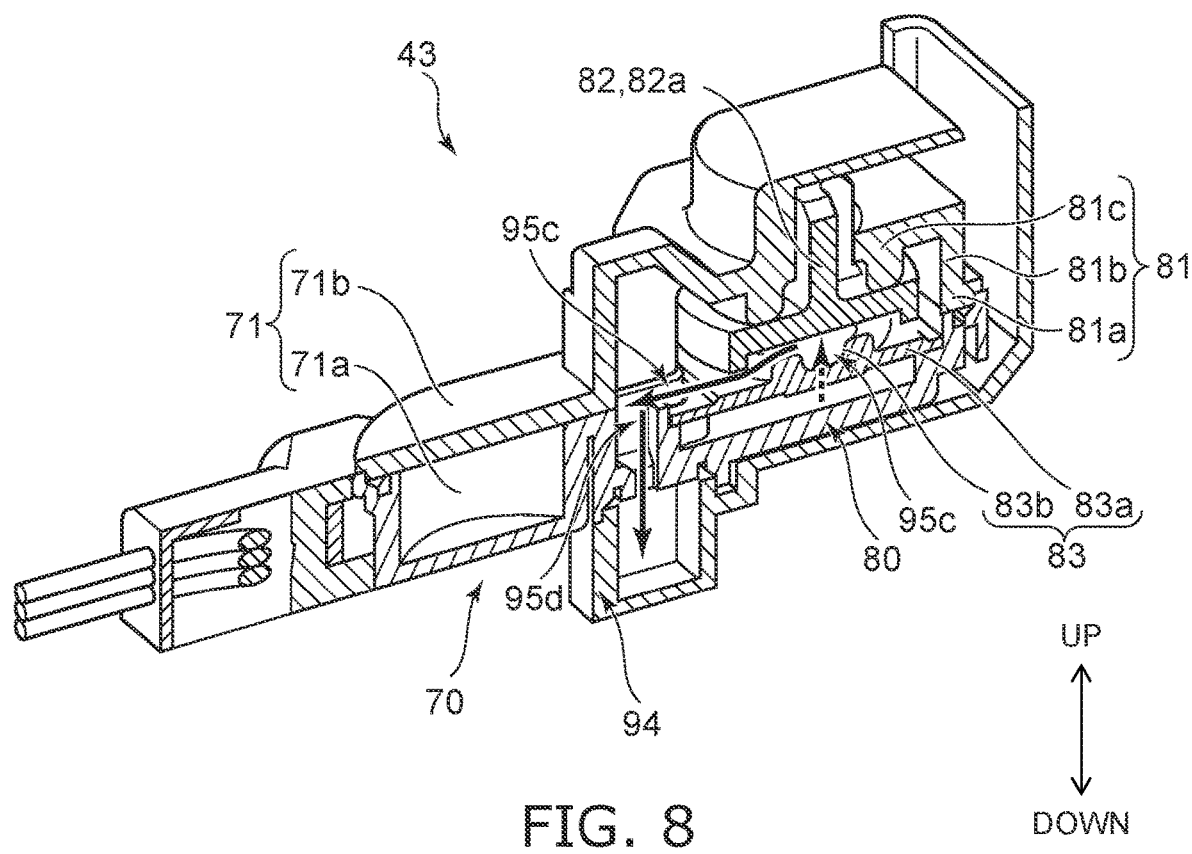
FIG. 8 is a perspective cross-sectional view illustrating the flow channel unit according to the embodiment.

FIG. 8 is a perspective cross-sectional view illustrating the flow channel unit according to the embodiment.

FIG. 7 is a perspective view as viewed from the upper side with the first upper case part 71*b*, the second upper case part 81*b*, and the valve part 82 (the float 82*a*) detached. As illustrated in FIGS. 6 to 8, the flow channel unit 43 includes a first flow channel 95*a*, a second flow channel 95*b*, a third flow channel 95*c*, and a fourth flow channel 95*d*.

The first flow channel 95*a* extends upward from the water inlet 93*a*. The first flow channel 95*a* is formed of the incoming water case part 93.

The second flow channel 95*b* extends in the horizontal direction from the upper end of the first flow channel 95*a* via the sensor part 72 (the impeller 72*a*) to a position below the valve part 82 (the float 82*a*). The second flow channel 95*b* is formed of the incoming water case part 93, the first case part 71, the second case part 81, and the pedestal part 83.

The third flow channel 95*c* extends upward from the second flow channel 95*b* and passes through the vacuum breaker 80. The third flow channel 95*c* is formed of the second case part 81, the valve part 82 (the float 82*a*), and the pedestal part 83.

The fourth flow channel 95*d* extends downward from the third flow channel 95*c* and is connected to the water outlet 94*a*. The fourth flow channel 95*d* is formed of the second case part 81 and the outgoing water case part 94.

The flow of water is shown by arrows in FIGS. 6 to 8. As illustrated in FIGS. 6 to 8, the water that is supplied through the water inlet 93*a* passes through the flow channels in the order of the first flow channel 95*a*, the second flow channel 95*b*, the third flow channel 95*c*, and the fourth flow channel 95*d* and flows through the water outlet 94*a* to the downstream side.

The water that enters the flow channel unit 43 through the water inlet 93*a* flows through the interior of the incoming water case part 93 and reaches the first case part 71 in which the sensor part 72 (the impeller 72*a*) is located. The water that reaches the first case part 71 flows through the interior of the first case part 71 and reaches the second case part 81 in which the valve part 82 (the float 82*a*) and the pedestal part 83 are located. The water that reaches the second case part 81 passes through the space between the second lower case part 81*a* and the main part 83*a* of the pedestal part 83 (i.e., below the pedestal part 83) and reaches the hole part 83*b* of the pedestal part 83. The water that reaches the hole part 83*b* of the pedestal part 83 flows upward through the hole part 83*b* from below and flows in the horizontal direction from a position above the hole part 83*b* and below the float 82*a* (i.e., passes through the vacuum breaker 80). The water that passes through the vacuum breaker 80 flows downward from the second lower case part 81*a*, reaches the outgoing water case part 94, and flows through the water outlet 94a to the downstream side.

Thus, compared to the case where all flow channels extend in the horizontal direction, the space can be effectively used because the flow channel unit 43 includes the first flow channel 95a, the third flow channel 95c, and the fourth flow channel 95d that extend in the vertical direction; and the flow channel unit 43 can be further downsized.

As illustrated in FIG. 8, the second upper case part 81b includes the intake port 81c positioned above the float 82a. For example, the intake port 81c is located at a higher position than the water outlet 94a. The float 82a can move vertically between the pedestal part 83 and the intake port 81c. When water does not flow, the float 82a drops and rests on the pedestal part 83. Air can be pulled into the vacuum breaker 80 in this state because the intake port 81c is not blocked. When water flows, the float 82a is pushed upward by the water flowing upward through the hole part 83b of the pedestal part 83; and the intake port 81c is blocked by the float 82a. Thereby, air is not pulled into the vacuum breaker 80.

Thus, by providing the intake port 81c at a higher position than the water outlet 94a, the backflow of water when negative pressure is generated can be reliably suppressed by the air intake of the intake port 81c.

Figure 9A:
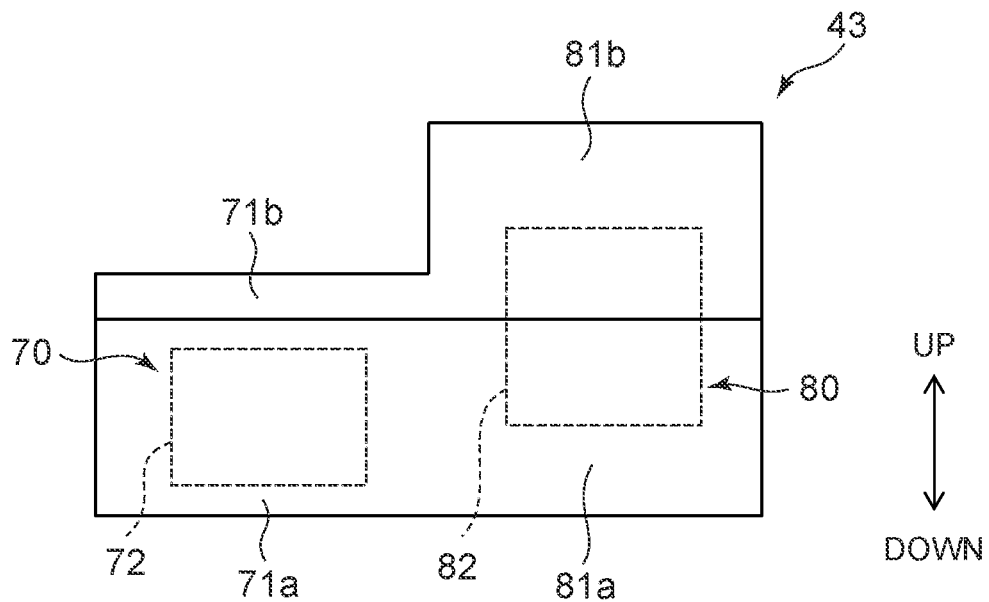
FIGS. 9A and 9B are explanatory drawings schematically illustrating the flow channel unit according to the embodiment.
Figure 9B:
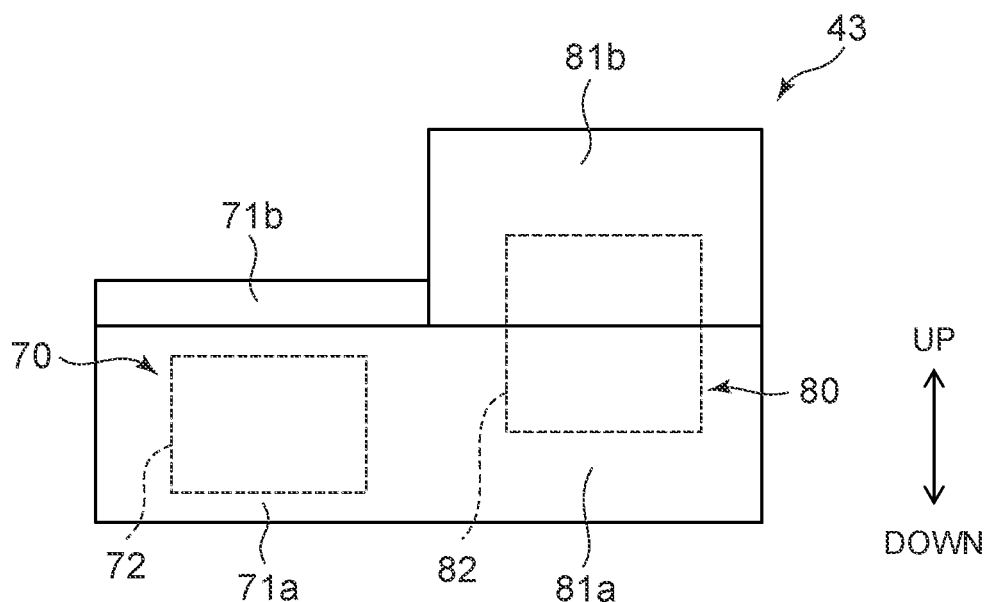

FIGS. 9A and 9B are explanatory drawings schematically illustrating the flow channel unit according to the embodiment.

As illustrated in FIGS. 9A and 9B, at least a part of the first case part 71 and at least a part of the second case part 81 are formed of a continuous member.

In the example of FIG. 9A, the first lower case part 71a and the second lower case part 81a are formed of a continuous member; and the first upper case part 71b and the second upper case part 81b are formed of a continuous member. That is, the sensor part 72 and the valve part 82 are housed between the lower case part of the continuous member and the upper case part of the continuous member.

In the example of FIG. 9B, the first lower case part 71a and the second lower case part 81a are formed of a continuous member, whereas the first upper case part 71b and the second upper case part 81b are not formed of a continuous member. Thus, other than being a continuous member, the upper case part may be divided into the first and second upper case parts 71b and 81b. In such a case as well, the path in which the water flows in the flow rate sensor 70 and the path in which the water flows in the vacuum breaker 80 can be shared, and the flow channel unit 43 can be downsized. The toilet device 500 (the sanitary washing device 100) can be downsized thereby.

Thus, according to the embodiment, a toilet device is provided in which the flow channel unit can be downsized.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. For example, the shape, the dimension, the material, the disposition, the installation feature or the like of the components included in the sanitary washing device 100 are not limited to the illustration and can be appropriately modified.

The components included in the embodiments described above can be combined within the extent of technical feasibility, and any combined components also are included in the scope of the invention to the extent that the feature of the invention is included.

What is claimed is:

1. A toilet device, comprising:
a nozzle discharging water toward a human body private part;
a flow channel connecting a water supply source and the nozzle;
a heat exchanger located in the flow channel, the heat exchanger warming water supplied from the water supply source; and
a flow channel unit located upstream or downstream of the heat exchanger in the flow channel,
the flow channel unit including
a flow rate sensor detecting a flow rate of water, and
a vacuum breaker suppressing a backflow of water,
the flow rate sensor including
a first case part, and
a sensor part housed inside the first case part,
the vacuum breaker including
a second case part, and
a valve part housed inside the second case part,
at least a part of the first case part and at least a part of the second case part being formed of a continuous member.

2. The device according to claim 1, wherein
the sensor part includes an impeller rotated by a flow of water,
the valve part includes a float switching between an outflow of water and an inflow of air,
the first case part includes
a first lower case part, and
a first upper case part fixed by fusing to the first lower case part,
the second case part includes
a second lower case part, and
a second upper case part fixed by fusing to the second lower case part,
the first lower case part and the second lower case part are formed of a continuous member, and
the first upper case part and the second upper case part are formed of a continuous member.

3. The device according to claim 2, wherein
the flow channel unit includes:
a water inlet positioned at an upstream end of the flow channel unit, and
a water outlet positioned at a downstream end of the flow channel unit,
the second upper case part includes an intake port positioned above the float, and
the intake port is located at a higher position than the water outlet.

4. The device according to claim 3, wherein
the flow channel unit includes:
a first flow channel extending upward from the water inlet;
a second flow channel extending in a horizontal direction from the first flow channel via the impeller to a position below the float;
a third flow channel extending upward from the second flow channel and passing through the vacuum breaker; and
a fourth flow channel extending downward from the third flow channel, and
the fourth flow channel is connected to the water outlet.

5. The device according to claim 1, wherein
the flow channel unit is located downstream of the heat exchanger, and
the vacuum breaker is located downstream of the flow rate sensor.

6. The device according to claim 5, wherein
the flow channel unit is connected to a downstream end of the heat exchanger.

7. The device according to claim 1, wherein
the flow channel unit further includes a first temperature sensor and a second temperature sensor detecting a temperature of water,
the first temperature sensor is located upstream of the flow rate sensor, and
the second temperature sensor is located downstream of the flow rate sensor.

\* \* \* \* \*